(12) United States Patent
Cao et al.

(10) Patent No.: US 8,406,132 B2
(45) Date of Patent: Mar. 26, 2013

(54) ESTIMATING CARDINALITY DISTRIBUTIONS IN NETWORK TRAFFIC

(75) Inventors: Jin Cao, Edison, NJ (US); Aiyou Chen, New Providence, NJ (US); Li Li, Edison, NJ (US)

(73) Assignee: Alcatel Lucent, Paris (FR)

( * ) Notice: Subject to any disclaimer, the term of this patent is extended or adjusted under 35 U.S.C. 154(b) by 1334 days.

(21) Appl. No.: 12/129,883

(22) Filed: May 30, 2008

(65) Prior Publication Data

US 2009/0296594 A1    Dec. 3, 2009

(51) Int. Cl.
*H04J 3/14* (2006.01)
*H04L 12/28* (2006.01)
*H04L 12/66* (2006.01)
(52) U.S. Cl. ......... 370/231; 370/235; 370/255; 370/356
(58) Field of Classification Search .................. None
See application file for complete search history.

(56) References Cited

U.S. PATENT DOCUMENTS

| 7,584,507 B1 * | 9/2009 | Nucci .............................. 726/23 |
| 2005/0220023 A1 * | 10/2005 | Kodialam et al. ............. 370/235 |
| 2007/0155396 A1 * | 7/2007 | Kim et al. ..................... 455/453 |

OTHER PUBLICATIONS

Cai et al. Fast and Accurate Traffic Matrix Measurement Using Adaptive Cardinality Counting. Aug. 22-26, 2005. ACM. Proceedings of the 2005 ACM SIGCOMM workshop on Mining network data. pp. 205-206.*

* cited by examiner

*Primary Examiner* — Melanie Jagannathan
(74) *Attorney, Agent, or Firm* — Mendelsohn, Drucker & Associates P.C.; Kevin M. Drucker; Steve Mendelsohn

(57) ABSTRACT

In one embodiment, a method of monitoring a network. The method includes: receiving, from each host of a set of two or more hosts of the network, a corresponding vector of M components constructed based on data packets received at the host during a time period, M being an integer greater than 1; and, based on the constructed vectors, using an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing one or more fields of the data packet received by the corresponding host.

18 Claims, 3 Drawing Sheets

US 8,406,132 B2

ESTIMATING CARDINALITY DISTRIBUTIONS IN NETWORK TRAFFIC

BACKGROUND OF THE INVENTION

1. Field of the Invention

The present invention relates to generally to networks, and more particularly, to analyzing traffic in a network.

2. Description of the Related Art

Network traffic analysis has become increasingly important for various network management and monitoring functions such as traffic engineering and anomaly detection and response. Due to high traffic volume in many high-speed networks, it can be useful to derive succinct summary information from such traffic volumes to facilitate the characterization of aggregate traffic behavior patterns.

Such aggregate behaviors are characterized by the host distributions of distinct communicating peers or flows. For example, port-scanning activities during a worm outbreak would cause many hosts to have an increasing number of (one-way) peers (or flows), and hence, a change in the host distributions of distinct communicating peers or flows.

One way to characterize aggregate traffic behavior patterns is by using feature distributions. In this regard, prior work has focused primarily on distributions concerning traffic volume, such as flow-size distribution (e.g., finding the total number of flows having a given flow size) and the inverse distribution of packet contents (e.g., finding the total number of strings having a given frequency). Distributional aspects, such as entropy (e.g., finding the entropy of a packet distribution over various ports) have also been subjects of interest.

Despite much work on feature distributions concerning traffic volume, little attention has been paid to traffic-feature distributions involving distinct counts, such as the number of destinations or flows corresponding to one or more given IP addresses. These distributions are very useful for characterizing communication connectivity patterns between hosts inside a network and across the Internet, which patterns might not be reflected by the volume data. Understanding such patterns is useful for network service providers to manage their networks more efficiently. On the traffic engineering side, if the number of peers for many hosts increases over time, this may indicate that the number of peer-to-peer (P2P) hosts is on the rise, which may further alert the network provider to improve its traffic-engineering solution for the P2P traffic. Statistically, the distribution of the number of peers vs. the number of hosts involves a mode change, i.e., a change in the value that occurs the most frequently in the distribution. In other words, a new mode appears for the common number of peers (typically a range from 64 to a few hundred, depending on the size of the P2P network) with which the P2P hosts are communicating. On the anomaly-detection side, if the number of peers for many hosts has a sudden increase, this may indicate attack activities, such as port scans. In this scenario, the distribution will have a shift in its mode.

Such distributional changes cannot be easily detected using marginal aspects such as entropy, mean, or variance. For example, a shift in the mean of a distribution with no shape change will not change the entropy, such that good estimates of the distributions in real time are desirable to permit capturing all such changes.

Besides estimating the distribution for all hosts communicating through a high-speed provider router, or all hosts inside a stub network, the distribution for each group of IP addresses can also be specifically monitored. One example is the detection of "botnets," which are compromised computers (dubbed "zombies" or "bots") running software, usually installed via worms, Trojan horses, or backdoors, under a common command and control infrastructure. In botnet detection, once the set of candidate bot controllers is identified, their behavior is then monitored. Monitoring the distribution of the peers of each candidate bot controller would therefore be desirable, because this distribution can identify whether many of the peers are actively working for the candidate bot controller. New attacks will result in changes of the cardinality distribution.

SUMMARY OF THE INVENTION

In one embodiment, the present invention provides a method of monitoring a network. The method includes: receiving, from each host of a set of two or more hosts of the network, a corresponding vector of M components constructed based on data packets received at the host during a time period, M being an integer greater than 1; and, based on the constructed vectors, using an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing one or more fields of the data packet received by the corresponding host.

In another embodiment, the present invention provides a server adapted to: receive, from each host of a set of two or more hosts of the network, a corresponding vector of M components constructed based on data packets received at the host during a time period, M being an integer greater than 1; and, based on the constructed vectors, use an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing one or more fields of the data packet received by the corresponding host.

In a further embodiment, the present invention provides a network comprising: a set of two or more hosts, each host adapted to construct a corresponding vector of M components based on data packets received at the host during a time period, M being an integer greater than 1; and a server adapted, based on the constructed vectors, to use an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing one or more fields of the data packet received by the corresponding host.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
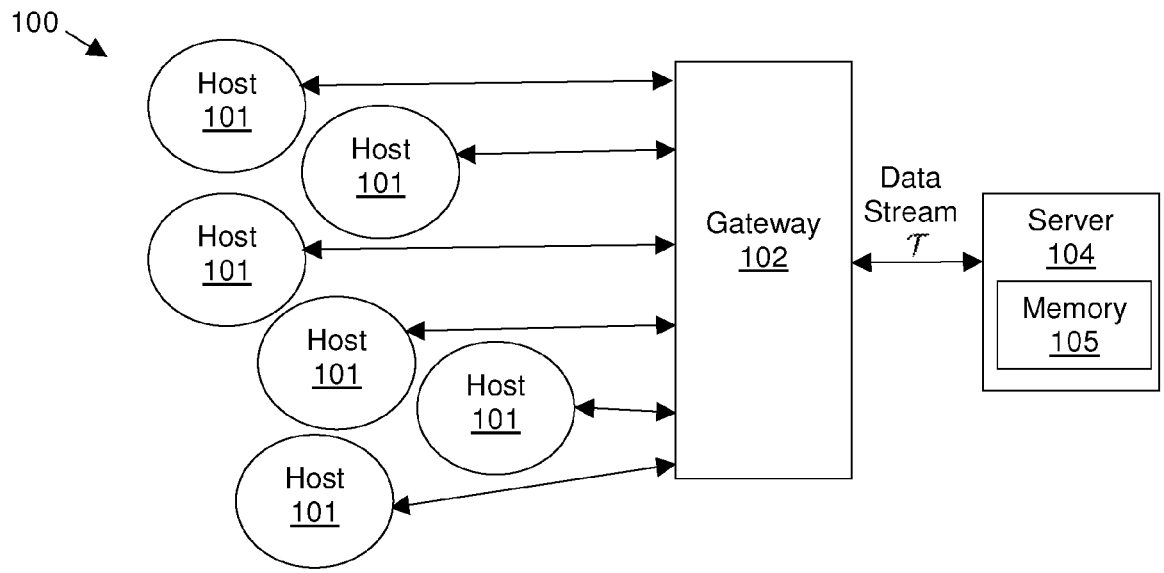
FIG. 1 is an exemplary block diagram of a network implementing an exemplary method consistent with one embodiment of the present invention.

Embodiments of the present invention use estimations of cardinality distributions, which are distributions of a distinct count of a number of given elements, in network traffic. For example, given a number n, how many IP addresses communicate with n different destinations or have n flows, as observed in a network.

Conventional methods developed for estimating traffic volume distributions might not be useful in such a determination, because traffic volume and cardinality are intrinsically different quantities—traffic volume is additive, but cardinality is not. As a result, it is relatively easy to compute individual volumes, but difficult to compute individual cardinalities. For example, to obtain the flow count for a host, either a hash table, bitmap, or Bloom filter is constructed to keep track of existing flows, to avoid duplicate flow records resulting from packets from the same flow. If T is the total number of flows of all hosts under study, then such cardinality counting would consume O(T) memory space, which is too costly to be practical.

Instead of performing the above cardinality counting for individual hosts, a more-sophisticated solution involves deriving the distribution from approximate counts using sampling-based methods, or alternatively, distinct counting algorithms, such as the well-known Flajolet-Martin (FM) vector-generation algorithm, proposed for calculating the cardinality of a single stream, as disclosed in Flajolet et al., "Probabilistic counting," *Proc. Symp. on Foundations of Computer Science (FOCS)*, 1983, which is incorporated herein by reference in its entirety. Another alternative is to use the Super-Log log counting algorithm, which is an improved version of the FM algorithm, as disclosed in Bar-Yossef et al., "Counting distinct elements in a data stream," *RANDOM 02: Proceedings of the 6th International Workshop on Randomization and Approximation Techniques*, pages 110 et seq., 2002, which is incorporated herein by reference in its entirety. Using the Super-Log log algorithm, it is shown that, for a relative error $\epsilon$, memory space of about $1/\epsilon^2 \log_2 \log_2(n)$ vectors is used for a host with cardinality n. For example, for a host with cardinality n=1,000,000, to achieve $\epsilon=0.05$, even with a vector of 5 bits, this would imply about 10,000 bits. It is noted that the design should be uniform over all hosts, since it is not known whether or not any particular host has a small cardinality before the end of the traffic stream. Although 10,000 bits seems small for an individual host, the total number of bits can become formidable when multiplied by the number of hosts m, which can be quite large for a high-speed network. For example, when m is 100,000, the total memory would be 1 G bits of SDRAM. Using this approach is therefore not practical for accurately counting cardinalities in a network with many hosts.

In embodiments of the present invention, the cardinalities of individual hosts are not explicitly counted, but rather, efficient statistical estimation methods are used to obtain an accurate estimate of the distribution by aggregating data regarding individual cardinalities in an optimal way. For a high-speed network with many hosts, even though each host count is only estimated, the independent observations from many hosts still provide sufficient information regarding the distribution.

Embodiments of the present invention will now be discussed in further detail in the following sequence.

First, an algorithm will be proposed for estimating the cardinality (i.e., the number of distinct peers or flows) distribution of a large number of hosts in a high-speed network, using FM vectors derived for distinct counting. The algorithm updates only one number (at most 32 bits) for each host and thus is both computationally and memory efficient.

Second, a novel statistical approach will be developed for estimating the cardinality distributions in network traffic. A non-parametric statistical model will be constructed based on the FM vectors, and a computationally elegant expectation-maximization (EM) algorithm will be developed, to derive the Maximum Likelihood Estimate (MLE) of the cardinality distribution.

In one embodiment, an estimation of the cardinality distribution (in flows or peers) is made in a network using flows or packets streams observed at individual hosts. This embodiment may be used in the exemplary system of FIG. 1, which is a block diagram of a network 100 implementing an exemplary method consistent with one embodiment of the present invention. As shown, network 100 includes a plurality of hosts 101 in communication with a gateway 102 that provides a single data stream $\tau$ to a server 104. Each host 101 is configured to construct a corresponding vector of M components based on data packets received at the host during a time period, M being an integer greater than 1. These vectors are all provided via gateway 102 to server 104, which includes a memory 105 (e.g., a hard disk or RAM device) that contains machine-readable instructions for generating a cardinality distribution estimate. Server 104 is configured to (i) receive the constructed vectors from hosts 101 and (ii) based on the constructed vectors, apply an algorithm to estimate the distribution of the number of IP addresses (from among all of the hosts of the set) that communicate with a given number of different destinations or have a given number of flows. It should be understood that server 104 and gateway 102, although shown as separate elements in FIG. 1, could alternatively be combined as a single element. It should also be understood that hosts 101 could be at a single site, at a plurality of geographically distributed locations, or a combination of both.

In this embodiment, different hardware and/or software modules are used, e.g., an online streaming module implemented at hosts 101 and a statistical estimation module implemented at server 104. The online streaming module is updated upon packet arrival at one of hosts 101. The estimation module proceeds in periods of time measured as epochs, wherein, at the end of each measurement epoch, the vector values for all hosts collected will be passed to the estimation module. The estimation module then produces an accurate estimation of the cardinality distribution using statistical inference techniques. This estimate characterizes the traffic at hosts 101 and can be used by server 104 for various traffic-monitoring or routing purposes. For example, server 104 might send messages to one or more hosts in the network (not shown) to admit new flows or peers into the network or to deny entrance to such new flows or peers, depending on the amount of traffic indicated by the cardinality distribution estimate.

Figure 2:
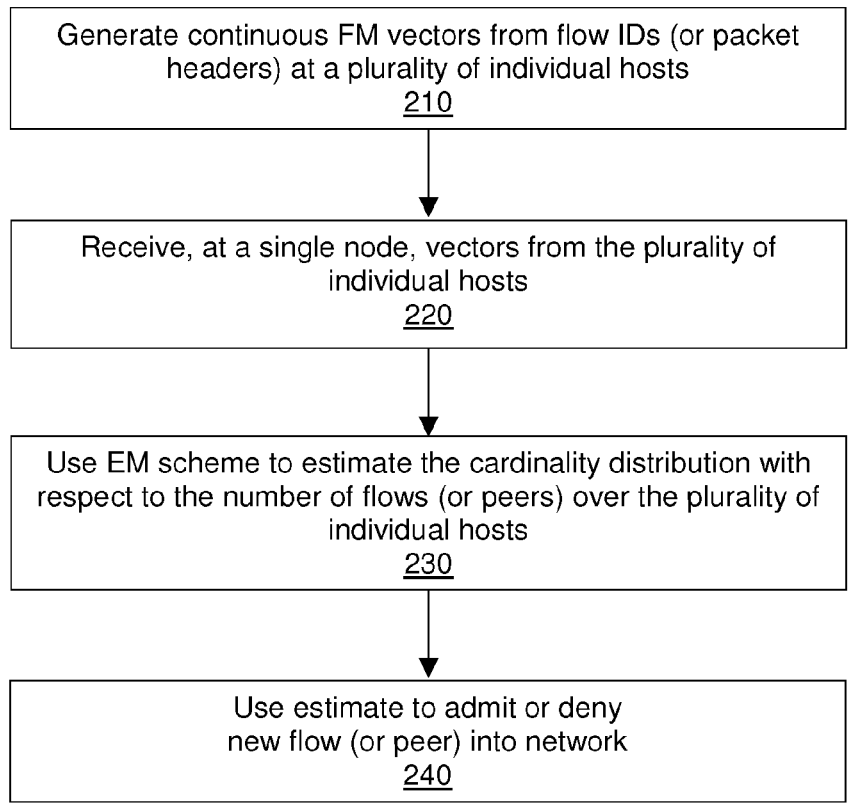
FIG. 2 is a flowchart of an exemplary method for monitoring flows or peers among multiple network hosts by using an Expectation-Maximization algorithm estimator.
Figure 3:
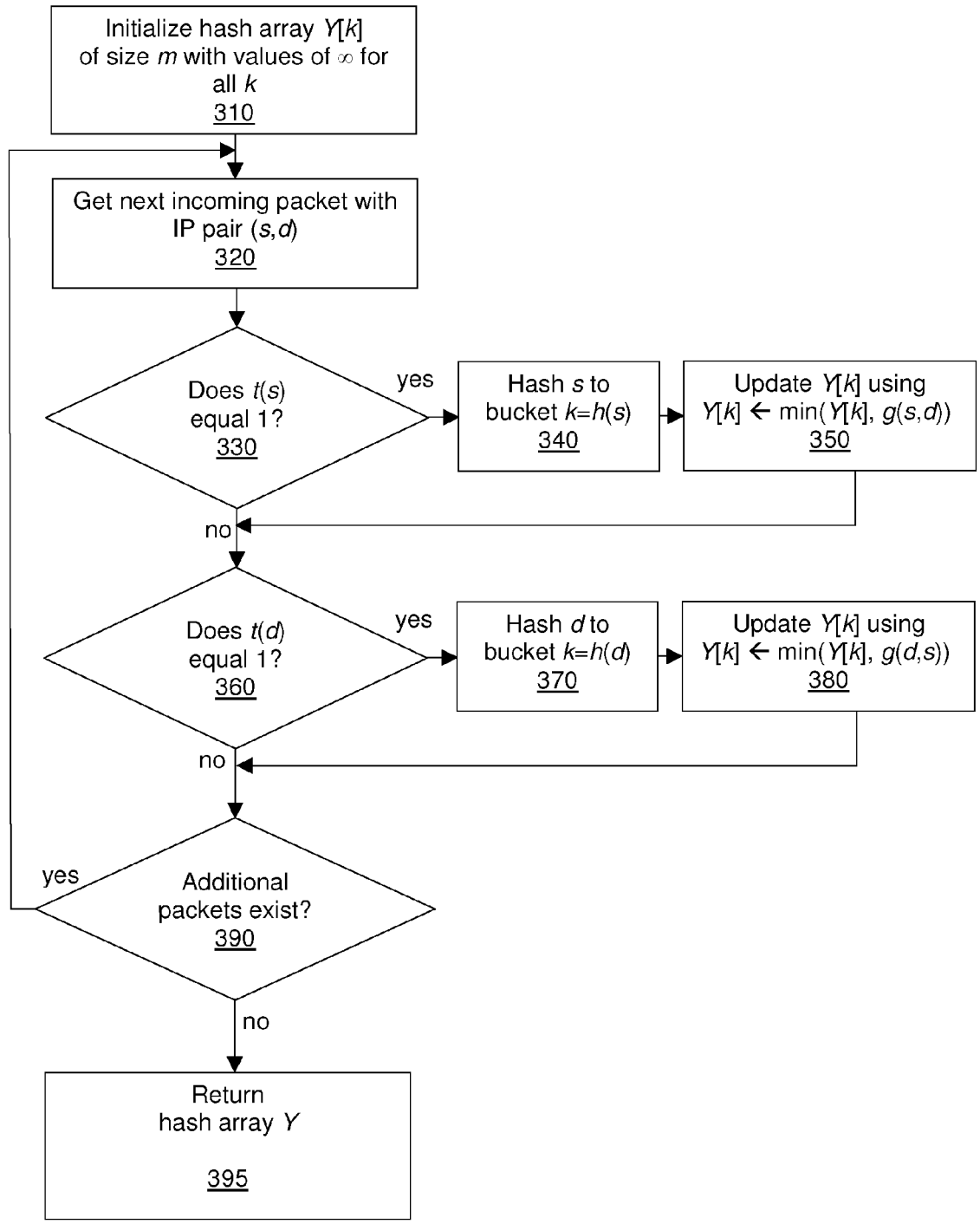
FIG. 3 is a flowchart illustrating a method for continuous FM-vector generation consistent with one embodiment of the present invention.

FIG. 2 shows an embodiment of a method for monitoring network hosts in one embodiment of the present invention. First, at step 210, continuous FM vectors from IP pairs are generated at a plurality of individual hosts in the network (e.g., as shown in the flowchart of FIG. 3, which will be discussed in further detail below). Step 210 can be carried out, e.g., according to Algorithm 1, below. Next, at step 220, the vectors from the plurality of individual hosts in the network are all received at a single node (e.g., server 104 of FIG. 1). This receiving step may be the result of one or more queries from the single node, or alternatively, the vectors may automatically be provided by the individual hosts. At step 230, an EM algorithm, as will be described in further detail below, is used to estimate the cardinality distribution with respect to the number of flows or peers over the plurality of individual hosts in the network, i.e., a cardinality distribution estimate is generated by applying an EM algorithm to the vectors. This generates an estimate of the distribution of the number of IP addresses (from among all of the hosts of the set) that communicate with a given number (or range of numbers) of different destinations or have a given number (or range of numbers) of flows. Step 230 can be carried out, e.g., by methods based on Algorithm 2, below. Lastly, at step 240, based on the traffic indicated by the cardinality distribution estimate of the number of flows or peers, a determination is made whether to admit one or more new flows or peers into the network.

The cardinality distribution can be estimated using vectors that are compact representations of the actual traffic of interest. The vectors have M components, where M>1. Such vectors may also be referred to as "sketches," "statistical sketches," "statistical digests," "digests," or "minimal statistics." Such vectors can be, e.g., sampling-based or hash-based probabilistic vectors. These probabilistic vector-based solutions, which largely focus on deriving novel algorithms for deriving the vectors, include the Flajolet-Martin (FM) estimator, proposed for calculating the cardinality of a single stream, as disclosed in Flajolet et al.

A continuous variant of the Flajolet-Martin (FM) vector, which is used to develop an efficient estimator for cardinality distributions, will now be described. Flajolet and Martin proposed an estimator for counting distinct values in a single stream, using a hash-based probabilistic vector with O(log N) space, where N is the true cardinality. In the original version of the Flajolet-Martin (FM) algorithm for generating vectors, a hash function is used to map an element in the stream to an integer that follows a geometric distribution. In embodiments of the present invention, a continuous variant of the FM algorithm is developed by replacing the geometric random number with a uniform random number. The continuous variant is used to simplify the statistical analysis, as will be discussed below.

To generate independent replicates of statistics used for counting cardinalities, a technique referred to as stochastic averaging is employed, as described in Durand et al., "Log log counting of large cardinalities," *Proceedings of European Symposium on Algorithms*, pages 605-617, 2003, which is incorporated herein by reference in its entirety. In stochastic averaging, elements are randomly distributed over an array of buckets.

For simplicity, it can be assumed that the network is of a medium size (from thousands to millions of hosts being monitored), and that it is affordable to record a given number Y of packets for each host of the network. For a very large-sized network, vectors can be maintained for uniformly sampled hosts. The only hosts of interest to record are those matching a given attribute t from data stream $\mathcal{T}$. Attribute t can be any attribute used to filter and monitor only a certain subset of traffic, i.e., the subset that matches attribute t. For example, if only incoming traffic is of interest, then attribute t can be used to filter out and ignore outgoing traffic. The function g is a universal hash function that maps an IP pair, which consists of the values (host, peer), to a uniform random number in [0,1]. For each packet, the expression e represents the (host, peer) IP pair, and the record for host i is updated by $$Y_i = \min(Y_i, g(e)), \tag{1}$$

where g is a uniform random-number generator using seed e. The function h is a universal hash function that maps an IP pair to a number in $\{1, \ldots, m\}$. Given the attribute filter function t, universal hash functions g, h, and the number m of hosts, an exemplary online streaming module is summarized in Algorithm 1, below, and illustrated in FIG. 3.

For the online streaming module, it can be assumed that there is a set of at most m hosts of interest that can pass filter function t. As shown in the flowchart of FIG. 3, the continuous FM vector Y[k], k=1, ..., m, is generated for an array of size m, using the following method. First, at step 310, the value of $Y_i$, which represents the number associated with a given host i, is initialized with a value of $\infty$ for all k. At step 320, the next incoming packet with IP pair (s,d) is examined, where s is a value identifying a host, and d is a value identifying a peer. At step 330, a determination is made whether t(s) has a value of 1, i.e., host s has attribute t, in which case the method proceeds to step 340. If t(s) does not have a value of 1, then the method proceeds to step 360. At step 340, s is hashed to a bucket k=h(s), where h is a universal hash function that maps an element uniformly over an array of m buckets. At step 350, Y[k] is updated using Y[k]←min(Y[k], g(s,d)), where the function g is a universal hash function that generates a random number by mapping element e to a uniform random number in [0,1], independent of h. At step 360, a determination is made whether t(d) has a value of 1, in which case the method proceeds to step 370. If t(d) does not have a value of 1, the method proceeds to step 390. At step 370, d is hashed to a bucket k=h(d). At step 380, Y[k] is updated using Y[k]←min(Y[k], g(d,s)). At step 390, a determination is made whether additional packets exist, in which case the method returns to step 320. If, at step 390, it is determined that no additional packets exist, then the method proceeds to step 395, wherein hash array Y is returned as a result.

At the end of a measurement epoch, $Y_i$ is the minimum of $N_i$ uniform random numbers associated with host i, which has $N_i$ distinct peers. It is highly probable that the larger $N_i$ is, the smaller $Y_i$ is. Thus, the magnitude of $Y_i$ provides information regarding $N_i$.

The following exemplary pseudo-code (Algorithm 1) may be used to implement continuous FM-vector generation for stream $\mathcal{T}$::

---

ALGORITHM 1:

1: Initialize a hash array Y of size m with values 1.
2: for each incoming packet with IP pair (s,d) of $\mathcal{T}$ do
3:   If t(s) == 1, hash s to a bucket k = h(s), and update Y[k] by min(Y[k],g(s,d))
4:   If t(d) == 1, hash d to a bucket k = h(d), and update Y[k] by min(Y[k],g(d,s))
5: Return Y at the end of a measurement epoch.

---

The steps of Algorithm 1 correspond generally to the steps of the flowchart of FIG. 3, as described above.

It is assumed above that two universal hash functions h and g are available for producing random independent numbers. To be more realistic, t-wise independent hashing, which employs additional storage for storing a seed, could alternatively be used.

Algorithm 1 is dubbed a "continuous" FM vector-generation algorithm, because the classical FM vector uses a discrete geometrical distribution instead of a continuous distribution. The purpose of using a continuous distribution is to keep the technical complexity of the calculations to a minimum. As implemented, discrete random numbers generated by a universal hash function are used. Any error introduced by such discretization has been found to be ignorable.

Accordingly, the approximate host count uses an FM vector, but only one random number (at most 32 bits) is actually maintained for each host, which is advantageous when the number of hosts is large.

One way of estimating the cardinality distribution for a network might involve counting the cardinality of each host individually using probabilistic counting algorithms, such as the following, which will be referred to herein as the "naïve" FM approach for estimating cardinality distribution: (1) use only a few FM vectors for each host for recording minimal statistics independently; (2) estimate the cardinality of each host using the corresponding FM vectors; and (3) compute a histogram as an estimate of the cardinality distribution. Alternatively, embodiments of the present invention may employ non-parametric statistical modeling, as follows.

Since the goal is to estimate the cardinality distribution, e.g., $N_i \sim F$, the hosts are considered independent, and thus, the cardinality of each host can be treated as a random sample from F. It is noted that cardinality takes values of positive integers, and its distribution usually has heavy tails, i.e., a high-frequency or high-amplitude population is followed by a low-frequency or low-amplitude population which gradually "tails off" asymptotically, such that the events at the far end of the tail have a very low probability of occurrence.

For simplicity, F is modeled using histograms in the $\log_2$ scale, i.e., bins are assigned to:

$$1, \{2,3\}, \ldots, \{2^K, 2^K+1, \ldots, 2^{K+1}-1\},$$

where $2^{K+1}$ is assumed to be the upper bound of the cardinalities. The right tail can be truncated into one bin if it is greater than or equal to $2^{K+1}$. Then, weight $p_k$ is assigned to bin $\{2^K, \ldots, 2^{K+1}-1\}$, for $k=0, \ldots, K$, where $\Sigma_{k=0}^{K} p_k = 1$. In other words, the log-scale histogram model is:

$$P(N \in \{2^K, \ldots, 2^{K+1}-1\}) = p_k, \quad (2)$$

with a total of K+1 bins. It is noted that it is not possible to track the probability of all values within each bin. However, there is no need to differentiate the probability of integers within each bin, and they are modeled with equal probability, i.e., for $j \in \{2^K, \ldots, 2^{K+1}-1\}$, $$P(N=j) = 2^{-k} p_k.$$

Thus, cardinality distribution F can be characterized by parameters $p_0, \ldots, p_K$. If the expression p is used to denote a histogram parameter such that $p = (p_0, \ldots, p_K)^T$, then p falls onto the simplex space $p_k \geq 0$, and $\sigma p_k = 1$.

The development of a Maximum-Likelihood Estimation (MLE) scheme for the non-parametric cardinality distribution will now be described, including deriving the log-likelihood function of the unknown histogram parameter p, and illustrating a computationally-elegant EM algorithm for obtaining the MLE.

By the Fisher information theory, for a model with finite parameters, an estimate that maximizes the (logarithmic) likelihood function (MLE) with given data is most efficient under regular conditions, as described in Bickel et al., *Mathematical Statistics: Basic Ideas and Selected Topics*, Vol. 1, (2nd Ed.), Prentice Hall, 2000, which is incorporated herein by reference in its entirety. The likelihood function of histogram parameter p will now be derived given the continuous-FM vectors $Y_1, \ldots, Y_m$ associated with m hosts, based on the following Result 1: If $Y = \min(U_1, \ldots, U_n)$, where $U_1, \ldots, U_n$ are n independent uniform random numbers, then $-\log(1-Y)$ follows an exponential distribution with mean $1/n$.

Following Result 1, the transformed values $-\log(1-Y_i)$, for simplicity still denoted as $Y_i$, $i=1, 2, \ldots, m$, will be used to estimate distribution F. Based on Result 1, for the ith host, there exists a unit exponential random number $\epsilon_i$ such that $$Y_i = \frac{\epsilon_i}{N_i},$$

where $N_i$ is the cardinality of the ith host. It is noted that, in the discussion herein, the i subscripts of $Y_i$, $N_i$, and $\epsilon_i$ may be omitted for convenience if no ambiguity results.

From the foregoing, the tail probability function of Y can be written as:

$$P(Y \geq y) = E[e^{-yN}]. \quad (3)$$

Using the log-scale histogram model, the following expressions are true:

$$E[e^{-yN}] = p_0 e^{-y} + \sum_{k=1}^{K} \frac{p_k}{2^k} \sum_{i=2^k}^{2^{k+1}-1} e^{-yi}$$

$$= p_0 q + \sum_{k=1}^{K} \frac{p_k}{2^k} \times \frac{q^{2^k}(1-q^{2^k})}{1-q},$$

where $q = e^{-y}$. If, for $k=0, 1, \ldots, K$, and $y > 0$, the expression $f_k(y)$ is defined as $$f_k(y) = \frac{q^{2^k}(1-q^{2^k})}{2^k(1-q)},$$

and $f(y) = (f_0(y), \ldots, f_K(y))^T$ is the column function vector, then $$E[e^{-yN}] = p^T f(y).$$

Now, the probability density function (PDF) of Y can be obtained from the tail probability as the derivative function of $1-P(Y \geq y)$, which is summarized in the following Statement 1:

---

STATEMENT 1:

Given the log scale histogram model of Equation (2) with parameters p for the distribution of N, the probability density function of Y can be written as $$p_Y(y, p) = p^T \tilde{f}(y), \quad (4)$$

where $\tilde{f}(y) = -(f_0'(y), \ldots, f_K'(y))^T$, and $$f_k'(y) = -\left\{ \frac{2^k q^{2^k}(1-2q^{2^k})}{1-q} + \frac{2^k q^{2^{k+1}}(1-q^{2^k})}{(1-q)^2} \right\} \quad (5)$$

is the derivative of $f_k(y)$. That is, Y follows a mixture distribution with component density functions $\tilde{f}(y)$.

---

It can be verified that each component of $\tilde{f}(y)$ is nonnegative, and that the integral of each component function for $y \geq 0$ is 1, and thus, each component of $\bar{f}(y)$ is, in fact, a probability density function. Although these are not traditional probability density functions, Equation (4) is a linear function of these density functions and thus implies that Y follows a mixed distribution.

Given observations $(Y_1, \ldots, Y_m)$ for m hosts respectively, the MLE of p can be defined as:

$$\hat{p} = \underset{p}{\operatorname{argmax}} \frac{1}{m} \sum_{i=1}^{m} \log(p^T \bar{f}'(Y_i)). \tag{6}$$

There is no closed form solution to the above optimization. It can be seen that this is a convex optimization problem with constraints. Standard primal-dual interior-point type algorithms can be used to solve the optimization when K+1 is small. However, when K+1 is large, the convergence becomes unstable.

To address this issue, an efficient algorithm is therefore developed, where each step is a closed-form iteration. This is motivated by the fact that the Y distribution belongs to the parametric family of mixture models, the MLE of whose parameters can be obtained conveniently using an Expectation-Maximization (EM) algorithm. An EM algorithm is an algorithm for finding maximum likelihood estimates of parameters in probabilistic models, where the model depends on unobserved latent variables. An EM algorithm alternates between performing an expectation (E) step, which computes the expected value of the latent variables, and a maximization (M) step, which computes the maximum likelihood estimates of the parameters given the data and setting the latent variables to their expectation. An exemplary EM algorithm is described in Dempster et al., "Maximum likelihood from incomplete data via the em algorithm," *Journal of the Royal Statistical Society, Series B (Methodological)*, p. 138, 1977, which is incorporated herein by reference in its entirety. This is summarized by the following Statement 2:

---

STATEMENT 2:

The objective function $\sum_{i=1}^{m} \log(p^T a_i)$ is convex, and it is strictly convex and thus has a unique maximizer on the simplex space unless the distinct values of $Y_i$ s is less than K + 1. The maximizer can be obtained by using the following iteration:

$$p \leftarrow \frac{1}{m} \sum_{i=1}^{m} \frac{p \cdot a_i}{p^T a_i}, \tag{7}$$

where $p \cdot a$ is a column vector defined by component-wise products of p and $a_i$, no matter what starting point on the simplex is used.

---

The process of iterating using Equation (7) is one form of an EM Algorithm. The MLE of p, i.e. $\hat{p}$, is thus obtained by the iteration algorithm described in the above Statement 2. The following exemplary pseudo-code (Algorithm 2) may be used to implement an EM algorithm to compute the MLE $\hat{p}$ of p as the distribution parameters:

---

ALGORITHM 2:

1: Input: Y from on-line streaming module
2: For i = 1, ..., m, compute $a_i = \bar{f}(Y[i])$ according to Equation (5)
3: Initiate p = (1, ..., 1)/(K + 1)
4: Iterate until convergence 5:
$$\text{update p by } \frac{1}{m} \sum_{i=1}^{m} \frac{p \cdot a_i}{p^T a_i}$$

6: Output: p

---

It has been shown that an EM algorithm converges fast and very reliably.

Methods consistent with the present invention can be used to determine the number of hosts, in a set of hosts, that have a given number of flows or peers.

Figure 4:
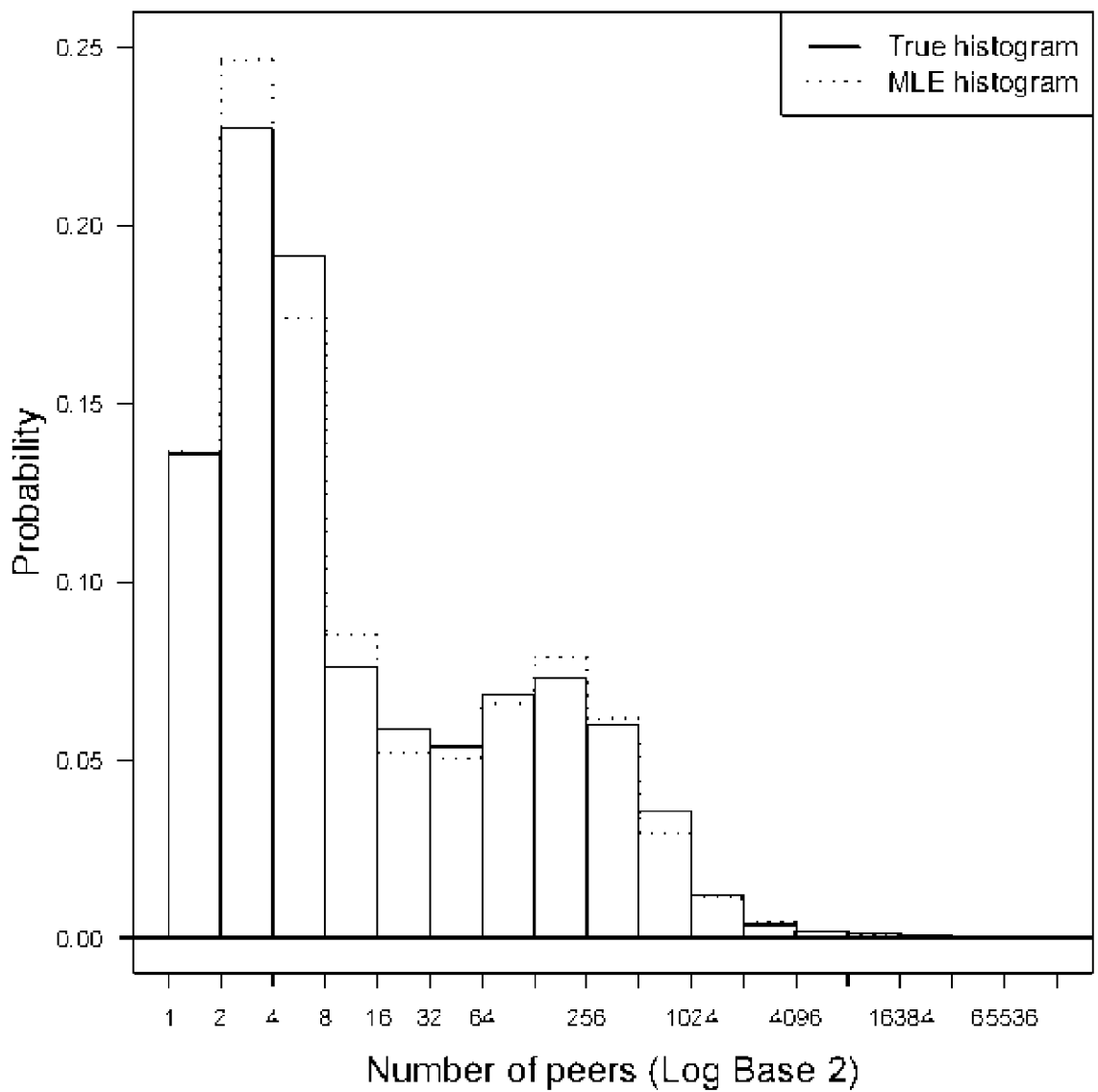
FIG. 4 shows histograms representing actual and estimated peer cardinality distributions of hosts in an exemplary network.

Methods consistent with the present invention can be also used to determine the number of hosts, in a set of hosts, that have a given range of numbers of flows or peers, expressed as the proportion of hosts that fall within each of a set of given intervals. For example, the number of hosts that have between 0 and 2 flows, the number of hosts that have between 3 and 10 flows, the number of hosts that have between 11 and 20 flows, and the number of hosts that have 21 or more flows. This is shown, e.g., in the histograms of FIG. 4, which provide peer cardinality distributions of hosts in an exemplary network for different ranges of numbers of peers. In FIG. 4, the x-axis shows the ranges of numbers of peers, and the y-axis shows probability, and the solid and dashed lines represent the true and estimated cardinality distributions, respectively.

While the invention has been described herein in the context of a particular EM algorithm, in alternative embodiments, the invention can be implemented in the context of other EM algorithms as well.

While embodiments of the invention disclosed herein use an FM method for generating vectors, it should be understood that an EM estimator consistent with alternative embodiments of the invention could use other methods for generating vectors.

The present invention has applicability in monitoring traffic in different environments and comprising data streams of different types, including not only traditional-network (e.g., hardwired LAN) data streams, but also, e.g., wireless-network data streams, sensor-network data streams, and financial-application data streams.

The term "random," as used herein, should not be construed as being limited to pure random selections or pure random number generations, but should be understood to include pseudo-random, including seed-based selections or number generations, as well as other selection or number generation methods that might simulate randomness but are not purely random. A hashing function, as used in embodiments of the present invention, may be based on random numbers, non-random numbers, or combinations of random and non-random numbers.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of data-storage media, such as magnetic recording media, optical recording media, solid state memory, floppy diskettes, CD-ROMs, hard drives, or any other machine-readable data-storage medium storing machine-readable program code, wherein the program code includes a set of instructions for executing one of the inventive methods on a digital data-processing machine, such as a computer, to perform the method. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method of monitoring a network, the method comprising:
    receiving, from each host of a set of two or more hosts of the network, a corresponding vector of M components constructed based on data packets received at the host during a time period, M being an integer greater than 1; and
    based on the constructed vectors, using an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing one or more fields of the data packet received by the corresponding host.

2. The method of claim 1, wherein the estimate of the cardinality distribution for the hosts in the set is an estimate of the cardinality distribution of the number of hosts in the set that communicate with a given number or range of numbers of peers.

3. The method of claim 1, wherein the estimate of the cardinality distribution for the hosts in the set is an estimate of the cardinality distribution of the number of hosts in the set that have a given number or range of numbers of flows.

4. The method of claim 1, wherein the updating further comprises determining a number to assign to the component for updating based on the fields of the data packet received by the one of the hosts.

5. The method of claim 4, wherein constructing a vector involves updating the number assigned to each component of one of the vectors by a process that changes the assigned number in a monotonic manner.

6. The method of claim 1, wherein the estimating involves evaluating cardinality distribution shared by the vectors.

7. A server comprising:
    a processor adapted to:
        receive, from each host of a set of two or more hosts of a network, a corresponding vector of M components constructed based on data packets received at the host during a time period, M being an integer greater than 1; and
        based on the constructed vectors, use an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing fields of the data packet received by the corresponding host.

8. The server of claim 7, wherein the estimate of the cardinality distribution for the hosts in the set is an estimate of the cardinality distribution of the number of hosts in the set that communicate with a given number or range of numbers of peers.

9. The server of claim 7, wherein the estimate of the cardinality distribution for the hosts in the set is an estimate of the cardinality distribution of the number of hosts in the set that have a given number or range of numbers of flows.

10. The server of claim 7, wherein the updating further comprises determining a number to assign to the component for updating based on the one or more fields of the data packet received by the one of the hosts.

11. The server of claim 10, wherein constructing a vector of M components involves updating the number assigned to each component of one of the vectors by a process that changes the assigned number in a monotonic manner.

12. The server of claim 7, wherein the estimate involves evaluating cardinality distribution shared by the vectors.

13. A network comprising:
    a set of two or more hosts, each host adapted to construct a corresponding vector of M components based on data packets received at the host during a time period, M being an integer greater than 1; and
    a server adapted, based on the constructed vectors, to use an expectation-maximization algorithm to estimate a cardinality distribution for the hosts in the set, wherein constructing a vector includes updating a component of the vector of the corresponding host in response to the corresponding host receiving a data packet, the updating including selecting the component for updating by hashing one or more fields of the data packet received by the corresponding host.

14. The network of claim 13, wherein the estimate of the cardinality distribution for the hosts in the set is an estimate of the cardinality distribution of the number of hosts in the set that communicate with a given number or range of numbers of peers.

15. The network of claim 13, wherein the estimate of the cardinality distribution for the hosts in the set is an estimate of the cardinality distribution of the number of hosts in the set that have a given number or range of numbers of flows.

16. The network of claim 13, wherein the updating further comprises determining a number to assign to the component for updating based on the one or more fields of the data packet received by the one of the hosts.

17. The network of claim 16, wherein constructing a vector of M components involves updating the number assigned to each component of one of the vectors by a process that changes the assigned number in a monotonic manner.

18. The network of claim 13, wherein the estimate involves evaluating cardinality distribution shared by the vectors.

* * * * *